US009548056B2

(12) United States Patent
Biswas

(10) Patent No.: US 9,548,056 B2
(45) Date of Patent: Jan. 17, 2017

(54) SIGNAL ADAPTIVE FIR/IIR PREDICTORS FOR MINIMIZING ENTROPY

(71) Applicant: DOLBY INTERNATIONAL AB, Amsterdam Zuidoost (NL)

(72) Inventor: Arijit Biswas, Nuremberg (DE)

(73) Assignee: Dolby International AB, Amsterdam (NL)

( * ) Notice: Subject to any disclaimer, the term of this patent is extended or adjusted under 35 U.S.C. 154(b) by 0 days.

(21) Appl. No.: 14/649,477

(22) PCT Filed: Dec. 19, 2013

(86) PCT No.: PCT/EP2013/077461

§ 371 (c)(1),
(2) Date: Jun. 3, 2015

(87) PCT Pub. No.: WO2014/096236

PCT Pub. Date: Jun. 26, 2014

(65) Prior Publication Data

US 2015/0317985 A1 Nov. 5, 2015

Related U.S. Application Data

(60) Provisional application No. 61/739,379, filed on Dec. 19, 2012.

(51) Int. Cl.
*G10L 21/00* (2013.01)
*G10L 19/00* (2013.01)
(Continued)

(52) U.S. Cl.
CPC ........... *G10L 19/0017* (2013.01); *G10L 19/04* (2013.01)

(58) Field of Classification Search
CPC .......... G10L 21/00; G10L 19/00; G10L 19/12; G10L 19/14
(Continued)

(56) References Cited

U.S. PATENT DOCUMENTS 6,784,812 B2 * 8/2004 Craven ............... H03M 7/3046 341/50
7,020,279 B2 * 3/2006 Usman .................. H04M 9/082 379/406.01

(Continued)

FOREIGN PATENT DOCUMENTS

WO 96/37048 11/1996
WO 2008/000316 1/2008

(Continued)

OTHER PUBLICATIONS

Schuller et al., "Perceptual audio coding using adaptive pre-and post-filters and lossless compression." Speech and Audio Processing, IEEE Transactions on 10.6 (2002): 379-390.*

(Continued)

*Primary Examiner* — Pierre-Louis Desir
*Assistant Examiner* — Seong Ah A Shin

(57) ABSTRACT

The present document relates to coding. In particular, the present document relates to coding using linear prediction in combination with entropy encoding. A method (600) for determining a general prediction filter for a frame of an input signal (111) is described. The z-transform of the general prediction filter comprises an approximation to the z-transform of a finite impulse response, referred to as FIR, filter with the z variable of the FIR filter being replaced by the z-transform of an allpass filter. The FIR filter comprises a plurality of FIR coefficients (412). The allpass filter exhibits a pole defined by an adjustable pole parameter. The method (600) comprises determining the pole parameter and the plurality of FIR coefficients, such that an entropy of a frame of a prediction error signal (414) which is derived from the frame of the input signal (111) using the general prediction filter defined by the pole parameter and the plurality of FIR coefficients (412) is reduced.

20 Claims, 8 Drawing Sheets

Figure 1A:
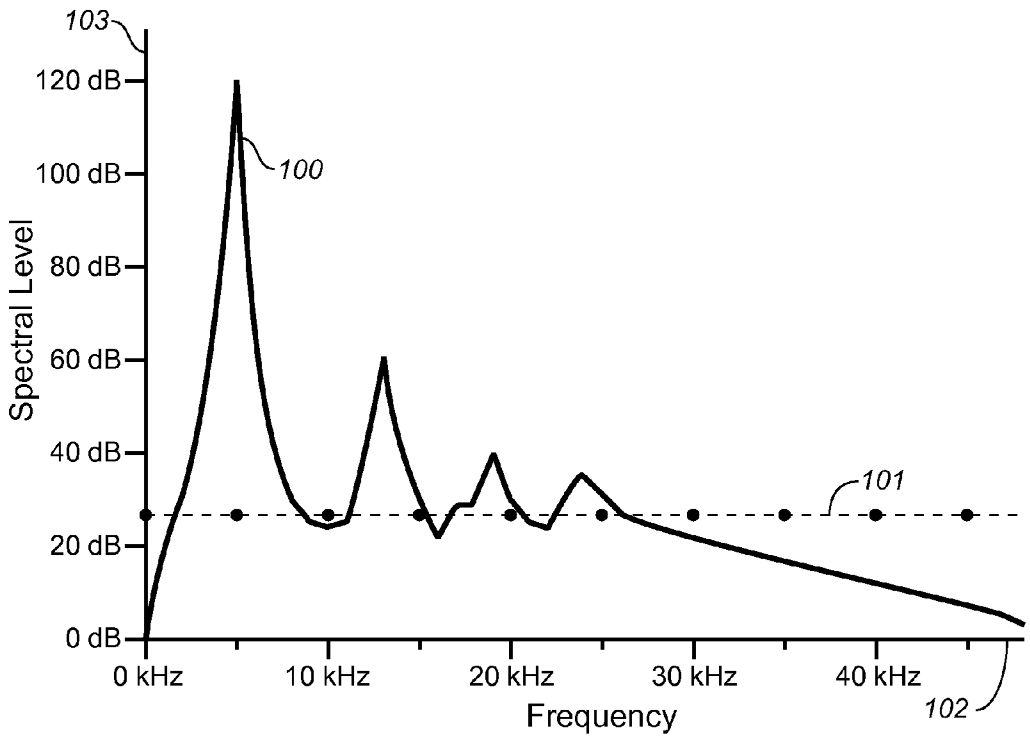

(51) Int. Cl.
*G10L 19/12* (2013.01)
*G10L 19/14* (2006.01)
*G10L 19/04* (2013.01)

(58) Field of Classification Search
USPC .................................... 704/211, 500; 381/23
See application file for complete search history.

(56) References Cited

U.S. PATENT DOCUMENTS 7,756,498 B2 7/2010 Park
7,986,756 B2 * 7/2011 Mergen ............... H04L 25/0212 375/350
8,199,924 B2 * 6/2012 Wertz ................... G10K 11/178 381/71.1
8,594,173 B2 * 11/2013 Andersen ........... H03H 21/0012 375/232
8,804,970 B2 * 8/2014 Grill ....................... G10L 19/18 381/1
9,015,041 B2 * 4/2015 Bayer ................... G10L 19/002 704/201
9,299,363 B2 * 3/2016 Bayer ................... G10L 19/167 704/211
2005/0228656 A1 * 10/2005 Den Brinker ........... G10L 19/04 704/224
2007/0106505 A1 5/2007 Gerrits
2008/0004869 A1 * 1/2008 Herre ...................... G10L 19/22 704/211
2009/0281798 A1 * 11/2009 Den Brinker ......... G10L 19/008 704/219
2010/0135172 A1 * 6/2010 Cui ................... H04W 72/1231 370/252
2010/0217790 A1 * 8/2010 Yang .................. H03H 17/0277 708/313
2011/0113081 A1 * 5/2011 Teramoto ........... H03H 17/0264 708/306
2011/0131265 A1 * 6/2011 Liu ...................... H04N 5/2628 708/313
2011/0246864 A1 * 10/2011 Eleftheriou ...... G11B 20/10009 714/799

FOREIGN PATENT DOCUMENTS

WO 2011/128272 10/2011
WO 2012/112357 8/2012

OTHER PUBLICATIONS

Voitishchuk et al., “Alternatives for warped linear predictors.” Proceedings of the 12th ProRISC Workshop. 2001.*
Karjalainen et al.,“Realizable warped IIR filters and their properties.” Acoustics, Speech, and Signal Processing, 1997. ICASSP-97., 1997 IEEE International Conference on. vol. 3. IEEE, 1997.*
Karjalainen et al., “Realizable warped IIR filter structures.” Proc. NorSig. vol. 96. 1996.*
Den Brinker, A. et al “Similarities and Differences Between Warped Linear Prediction and Laguerre Linear Prediction” IEEE Transactions on Audio, Speech, and Language Processing, vol. 19, No. 1, Jan. 2011, pp. 24-33.
McSweeney, S.G. et al “Adaptive IIR Filtering Algorithms for Enhanced CMUT Performance” IEEE Ultrasonics Symposium, Oct. 11-14, 2010, San Diego, CA, pp. 2036-2039.
Cui, T. et al “First Order Adaptive IIR Filter for CQI Prediction in HSDPA” IEEE Wireless Communications and Networking Conference, Sydney, Australia, Apr. 18-21, 2010, pp. 1-5.
Sasaoka, N. et al. “A Study on Noise Estimation Based on Robust Equation Error IIR ADF for Speech” IEEE 10th International Conference on Signal Processing, Oct. 24-28, 2010, Beijing, pp. 127-130.
Voitishchuk, V. et al “Alternatives for Warped Linear Predictors” Proc. 12th ProRISC Workshop, Nov. 29, 2001, pp. 710-713.
Schuller, G. et al. “Perceptual Audio Coding Using Adaptive Pre-and-Post-Filters and Lossless Compression” IEEE Transactions on Speech and Audio Processing, New York, NY, vol. 10, No. 6, Sep. 1, 2002.

* cited by examiner

SIGNAL ADAPTIVE FIR/IIR PREDICTORS FOR MINIMIZING ENTROPY

TECHNICAL FIELD

The present document relates to coding. In particular, the present document relates to lossless coding using linear prediction, possibly in combination with entropy encoding.

BACKGROUND

Audio encoders and in particular lossless audio encoders typically employ a FIR (Finite Impulse Response) prediction filter to reduce the entropy of an audio signal. Employing an IIR (Infinite Impulse Response) prediction filter may lead to improved prediction results and to reduced entropy of the prediction error signal. IIR prediction filters may e.g. be used in the so-called Dolby TrueHD lossless encoder. However, unlike FIR predictors it is typically difficult to derive optimal IIR prediction coefficients on a frame-by-frame basis that guarantees the stability of the predictor system (for the encoder) and its inverse system (for the decoder).

The present document addresses the above-mentioned technical problem. In particular, the present document describes methods for determining the coefficients of IIR-based prediction filters which lead to improved prediction results (i.e. which lead to a reduction of the entropy of the prediction error signal). The IIR prediction filters may be determined such that stability may be guaranteed. As such, the methods described in the present document enable the use of IIR-based prediction, thereby providing audio encoders (in particular lossless audio encoders) with improved coding gains.

SUMMARY

According to an aspect a method for determining a general prediction filter for a frame of an input signal is described. The general prediction filter may be determined such that it is ensured that the determined general prediction filter is stable. Typically the frame of the input signal (e.g. an audio signal such as a speech signal or a music signal, or an image signal, e.g. a line or a column of an image) comprises a plurality of samples (e.g. 50 or more, or 100 or more samples). The general prediction filter may comprise an infinite impulse response (IIR) prediction filter. In general terms, the general prediction filter may comprise an IIR prediction filter component and/or an FIR prediction filter component. The z-transform of the general prediction filter may be represented as a ratio of an FIR filter in the numerator and an FIR filter in the denominator. In particular, the z-transform of the general prediction filter (also referred to as the transfer function of the general prediction filter or the z-transform of the impulse response of the general prediction filter) may be presented in a form which comprises an approximation to the z-transform of a finite impulse response (FIR) filter with the z variable of the FIR prediction filter being replaced by the z-transform of an allpass filter. By way of example, the general prediction filter may be presented in a form which comprises the z-transform of a FIR filter with the z variable of the FIR prediction filter being replaced by the z-transform of an allpass filter. In other words, it is proposed to make use of a general prediction filter (which may comprise an IIR prediction filter) which may be derived by replacing the delays of an FIR prediction filter with allpass filters. The FIR filter typically comprises a plurality (K with K>1, e.g. K=4 or 8 or more) of FIR coefficients. The allpass filter may exhibit a pole defined by an adjustable pole parameter λ. As such, the general prediction filter may be defined by the plurality of FIR coefficients and by the pole parameter λ. In an embodiment, the allpass filter exhibits a single pole defined by a single adjustable pole parameter.

As indicated above, the z-transform of the general prediction filter may be derived from (an approximation of) the z-transform of an FIR filter with the z variable of the FIR prediction filter being replaced by the z-transform of an allpass filter. In particular, the general prediction filter may be determined by first determining an intermediate general prediction filter having a z-transform which (exactly) comprises the z-transform of an FIR filter with the z variable of the FIR prediction filter being replaced by the z-transform of an allpass filter. The coefficients of the intermediate general prediction filter may then be approximated (e.g. the coefficients may be quantized), thereby yielding the coefficients of the general prediction filter. As a consequence of the approximation of the coefficients of the intermediate general prediction filter, the z-transform of the general prediction filter comprises an approximation of the z-transform of an FIR filter with the z variable of the FIR prediction filter being replaced by the z-transform of an allpass filter. The approximation may be due to the quantization of filter coefficients and/or due to the transformation of the FIR filter coefficients and the pole parameter to an IIR filter representation (as described below in the context of the "mapping" feature).

The pole parameter λ may be used to adapt the general prediction filter between an FIR prediction filter and an IIR prediction filter. In other words, the method may yield an adaptive general prediction filter which may adapt its filter structure (i.e. IIR structure or FIR structure) to the frame of the input signal using one or more pole parameters λ. It should be noted that a general prediction filter having an IIR structure typically also comprises an FIR filter component. On the other hand, a general prediction filter having an FIR structure typically only comprises an FIR filter component.

By way of example, the z-transform of the allpass filter may comprise the z-transform of the following allpass filter $$A(z)=\frac{z^{-1}-\lambda}{1-\lambda z^{-1}};\ |\lambda|<1,$$

with λ being the pole parameter adjustable between values ±1. In particular, the pole parameter may be unequal to zero, thereby providing a general prediction filter which exhibits an infinite impulse response. On the other hand, if the pole parameter is determined to be zero, the general prediction filter typically corresponds to an FIR prediction filter. This means that for the particular frame of the input signal, entropy minimization may be achieved using an FIR prediction filter without the need of providing an IIR prediction filter. Furthermore, the z-transform of the general prediction filter may comprise a pre-filter configured to whiten a spectrum of the prediction error signal. By whitening the spectrum of the prediction error signal, the entropy encoding of the prediction error signal may be performed with increased efficiency. In addition, the z-transform of the general prediction filter may comprise an overall delay. By inserting an overall delay, it may be ensured that the general prediction may be performed in a causal manner.

In a particular example, the z-transform of the general prediction filter may be representable as $\Sigma_{k=1}^{K} z^{-1}\beta_k H_k(z)$, with k=1, . . . , K, with K>1, with $$H_k(z) = \frac{\sqrt{1-\lambda^2}}{1-z^{-1}\lambda}\left(\frac{z^{-1}-\lambda}{1-z^{-1}\lambda}\right)^{k-1},$$

and with $\beta_k$, k=1, . . . , K being the plurality of FIR coefficients (412). It can be seen that the general prediction filter comprise an overall delay $z^{-1}$ and that each filter component $H_k(z)$ comprises a pre-filter $$\frac{\sqrt{1-\lambda^2}}{1-z^{-1}\lambda}$$

for whitening purposes.

The method may comprise determining the pole parameter and the plurality of FIR coefficients, such that an entropy of a frame of a prediction error signal which is derived from the frame of the input signal using the general prediction filter defined by the pole parameter and the plurality of FIR coefficients is reduced (e.g. is minimized). The general prediction filter may be used to determine a frame of an estimated signal (e.g. an estimated audio signal or an estimated image signal) from the frame of the input signal. The difference between the frame of the estimated signal and the frame of the input signal may provide the frame of the prediction error signal. The pole parameter and the plurality of FIR coefficients may specify the general prediction filter, and the general prediction filter may be adjusted such that the entropy of the frame of the prediction error signal is reduced (e.g. minimized).

The entropy of the frame of the prediction error signal may be estimated by determining a probability distribution of the values of samples of the frame of the prediction error signal. The entropy may be estimated based on a weighted sum of the probability distribution. The weighted sum of the probability distribution may be given by $$\sum_i P_i \cdot \log_b(P_i),$$

with $P_i$ being the probability of the value i of a sample of the prediction error signal and with b being the base of the log function (e.g. b=2 or 10 or e, i.e. Euler's number).

Determining the pole parameter and the plurality of FIR coefficients may comprise setting the adjustable pole parameter to a fixed first value and determining the plurality of FIR coefficients using the set pole parameter. For a fixed or set pole parameter, determining the plurality of FIR coefficients may comprise determining the plurality of FIR coefficients such that a mean squared power of the frame of the prediction error signal is reduced. In view of the fact that the general prediction filter is derived from an FIR filter, this target may be achieved by solving a set of normal equations (e.g. using a Levinson-Durbin algorithm). By way of example, for a fixed or a set pole parameter, determining the plurality of FIR coefficients may comprise determining a frame of a regressor signal based on the frame of the input signal for each tap of the general prediction filter (i.e. for each filter component $H_k(z)$), thereby yielding a plurality of regressor signal frames. The plurality of regressor signal frames may be used to determine an autocorrelation matrix Q for the plurality of regressor signal frames. The size of the autocorrelation matrix Q typically depends on the number K of FIR coefficients which are to be determined. Furthermore, a cross-correlation vector P may be determined based on the plurality of regressor signal frames and the frame of the input signal. An FIR coefficient vector β comprising the plurality of FIR coefficients may be determined by solving the normal equations Qβ=P.

Determining the pole parameter and the plurality of FIR coefficients may comprise estimating the entropy of the frame of the prediction error signal obtained using the general prediction filter defined by the set pole parameter and the plurality of FIR coefficients. The plurality of FIR coefficients have been determined based on the set pole parameter (e.g. using the above mentioned set of normal equations). The steps of determining the plurality of FIR coefficients (for a set pole parameter) and of estimating the entropy may be repeated for a plurality of differently set pole parameters, thereby yielding a corresponding plurality of entropy values. The pole parameter may be selected from the plurality of differently set pole parameters, which reduces the estimated entropy of the frame of the prediction error signal. In other words, the pole parameter which yields the lowest entropy from the plurality of entropies may be selected. Furthermore, the plurality of FIR coefficients which has been determined using the selected pole parameters may be selected. The selected pole parameter and the selected plurality of FIR coefficients may be the pole parameter and the plurality of FIR coefficients, which reduce (e.g. minimize) the entropy of the frame of the prediction error signal.

Alternatively or in addition, setting the pole parameter to a fixed first value may comprise estimating a frequency based on the frame of the input signal. In particular, a dominant frequency of the frame of the input signal may be estimated. Estimating a frequency based on the frame of the input signal may comprise determining a spectral envelope of a spectrum of the frame of the input signal, and estimating the frequency of the frame of the input signal based on the spectral envelope (e.g. based on a maximum of the spectral envelope). The first value for the pole parameter may be determined based on the estimated frequency, e.g. using a pre-determined look-up table or a pre-determined function. The pre-determined look-up table or function may provide a mapping between a plurality of frequency values and a corresponding plurality of pole parameter values. The pre-determined look-up table or function may be determined experimentally, e.g. using a training set of input signals.

The z-transform of the general prediction filter may be representable as a ratio of a first and a second FIR filter (e.g. the filters A and B as described in the present document) comprising first and second sets of coefficients, respectively. The first and second FIR filters may be filters in accordance to the True HD coder. The method may further comprise mapping the determined pole parameter and the determined plurality of FIR coefficients to the first and second sets of coefficients. By way of example, the mapping may make use of formulas (e.g. the formulas described in the present document) for determining the first and second sets of coefficients from the determined pole parameter and from the determined plurality of FIR coefficients. The formulas may provide for an exact bi-directional transformation of the first and second sets of coefficients and of the determined pole parameter and the determined plurality of FIR coefficients. Alternatively the formulas may yield an approximation of the general prediction filter described by the determined pole parameter and the determined plurality of FIR coefficients. Alternatively or in addition, the mapping may comprise quantizing of the first and second sets of coefficients. As such, the general prediction filter may be used in conjunction with incumbent IIR-based encoders such as the True HD coder, thereby allowing the reuse of an already existing installed base of decoders.

According to a further aspect, a method for encoding a frame of an input signal using a general prediction filter is described. The method comprises determining the general prediction filter using the methods described in the present document. Furthermore, the method comprises determining an estimate of the frame of the input signal using the determined general prediction filter. A frame of a prediction error signal may be determined based on the estimated frame and the frame of the input signal (e.g. based on the difference). The method may comprise encoding information indicative of the determined general prediction filter; and encoding the frame of the prediction error signal (e.g. using an entropy encoder). The information indicative of the determined general prediction filter may comprise the pole parameter.

According to a further aspect, an encoded signal (e.g. an encoded audio signal or an encoded image signal) is described. The encoded signal comprises information indicative of a general prediction filter to be used by a decoder for decoding the encoded signal. The z-transform of the general prediction filter may be representable by a filter comprising (or having) the z-transform of a FIR filter with the z variable of the FIR filter being replaced by the z-transform of an allpass filter or an approximation of the z-transform of a FIR filter with the z variable of the FIR filter being replaced by the z-transform of an allpass filter. The FIR filter may comprise a plurality of FIR coefficients and the allpass filter may exhibit a pole defined by a pole parameter. The information indicative of the general prediction filter may comprise information indicative of the pole parameter.

According to another aspect, a method for determining a look-up table providing a mapping between an estimated frequency of a frame of an input signal and a pole parameter defining a pole of an allpass filter is described. The allpass filter may be used to provide a general prediction filter based on an FIR filter. The method may comprise providing a training set of different frames of input signals. The training set of frames may be used to estimate a corresponding set of frequencies for the training set of frames. Furthermore, a set of pole parameters may be determined which provide general prediction filters that reduce an entropy of frames of prediction error signals. The set of pole parameters may be determined using the methods described in the present document. The method may comprise determining the look-up table based on the set of frequencies and based on the corresponding set of pole parameters. In particular, clustering techniques may be used to determine the look-up table from the set of frequencies and the corresponding set of pole parameters.

According to a further aspect, a method for decoding an encoded signal is described. The encoded signal may have been encoded as described in the present document. The method may comprise receiving information indicative of a pole parameter of an allpass filter. The allpass filter may be used to provide a general prediction filter based on an FIR filter comprising a plurality of FIR coefficients. The method may comprise receiving information indicative of the plurality of FIR coefficients. The general prediction filter may be determined based on the received information indicative of the pole parameter and based on the received information indicative of the plurality of FIR coefficients. The general prediction filter may be used to decode the encoded signal. In particular, the method may comprise decoding a frame of a prediction error signal (comprised within the encoded signal). A frame of an estimated input signal (also referred to as the estimated decoded signal) may be determined based on the decoded frame of the prediction error signal and based the FIR prediction filter. A decoded frame of the encoded signal may be determined based on the frame of the estimated input signal and based the decoded frame of the prediction error signal.

According to another aspect, an encoder (e.g. an audio encoder or an image encoder) configured to determine a general prediction filter for a frame of an input signal is described. The z-transform of the general prediction filter may be indicative of (or may correspond to) the z-transform of a FIR filter with the z variable of the FIR filter being replaced by the z-transform of an allpass filter or of an approximation to the z-transform of a FIR filter with the z variable of the FIR filter being replaced by the z-transform of an allpass filter. The FIR filter may comprise a plurality of FIR coefficients. The allpass filter may exhibit a pole defined by an adjustable pole parameter. The encoder may be configured to determine the pole parameter and the plurality of FIR coefficients, such that an entropy of a frame of a prediction error signal is reduced (e.g. minimized). The frame of the prediction error signal is derived from the frame of the input signal using the general prediction filter, wherein the general prediction filter is defined by the pole parameter and the plurality of FIR coefficients.

According to another aspect, a decoder (e.g. an audio decoder or an image decoder) for decoding an encoded signal (e.g. an encoded audio signal or an encoded image signal) is described. The decoder may be configured to extract information indicative of a pole parameter of an allpass filter from the encoded signal. The allpass filter may be used to provide a general prediction filter based on an FIR filter comprising a plurality of FIR coefficients. The decoder may be further configured to extract information indicative of the plurality of FIR coefficients from the encoded signal. In addition, the decoder may be configured to determine the general prediction filter based on the extracted information indicative of the pole parameter and based on the extracted information indicative of the plurality of FIR coefficients. The general prediction filter may be used by the decoder to decode the encoded signal.

According to a further aspect, a method for decoding a frame of an encoded signal using a general prediction filter is described. The frame of the encoded signal may be indicative of coefficients of the general prediction filter. As outlined above, the general prediction filter may comprise an IIR prediction filter. Furthermore, the frame of the encoded signal may be indicative of a frame of a prediction error signal. The method may comprise extracting (indications of) coefficients of the general prediction filter from the encoded signal. The coefficients of the general prediction filter may have been determined using the methods described in the present document. Furthermore, the method may comprise decoding the frame of the prediction error signal (e.g. using a de-quantizer). The method may proceed in determining a frame of an estimated decoded signal based on the decoded frame of the prediction error signal and based on the general prediction filter. Furthermore, the method may comprise determining a decoded frame of the encoded signal based on the frame of the estimated decoded signal and based on the decoded frame of the prediction error signal. In particular, the decoded frame of the encoded signal may be determined by adding corresponding samples of the frame of the estimated decoded signal and of the decoded frame of the prediction error signal.

According to another aspect, a decoder for decoding an encoded signal is described. The encoded signal may be indicative of coefficients of a general prediction filter and of samples of a prediction error signal. The decoder may comprise means for extracting coefficients of the general prediction filter from the encoded signal. The coefficients of the general prediction filter may have been determined using the methods described in the present document. The coefficients may be associated with a frame of the encoded signal. Furthermore, the decoder may comprise means for decoding a frame of the prediction error signal, e.g. using a de-quantizer. In addition, the decoder may comprise means for determining a frame of an estimated decoded signal based on the decoded frame of the prediction error signal and based on the general prediction filter. Furthermore, the decoder may comprise means for determining a decoded frame of the encoded signal based on the frame of the estimated decoded signal and based the decoded frame of the prediction error signal.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including their preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 1B:
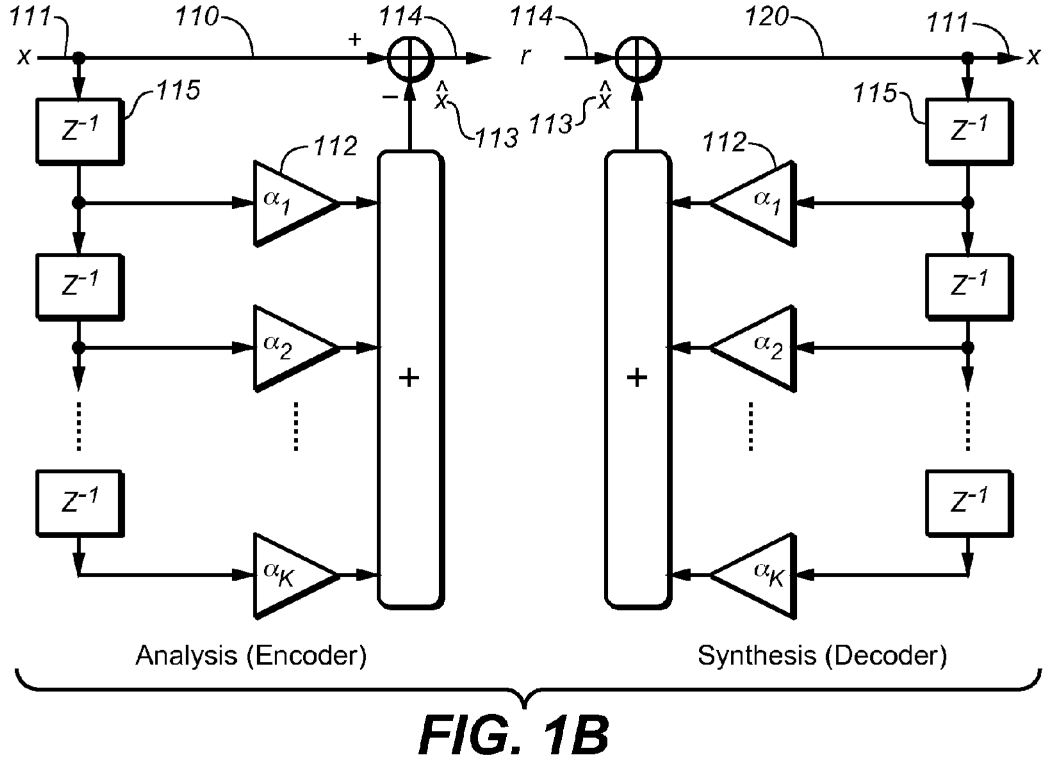
Figure 2A:
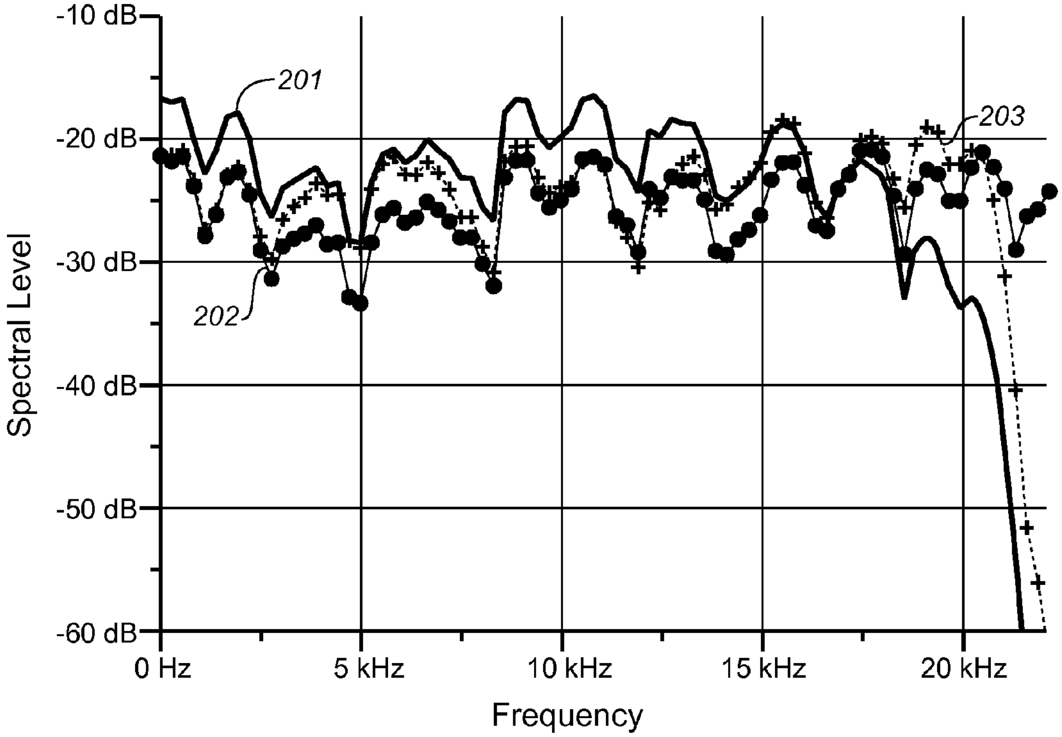
Figure 2B:
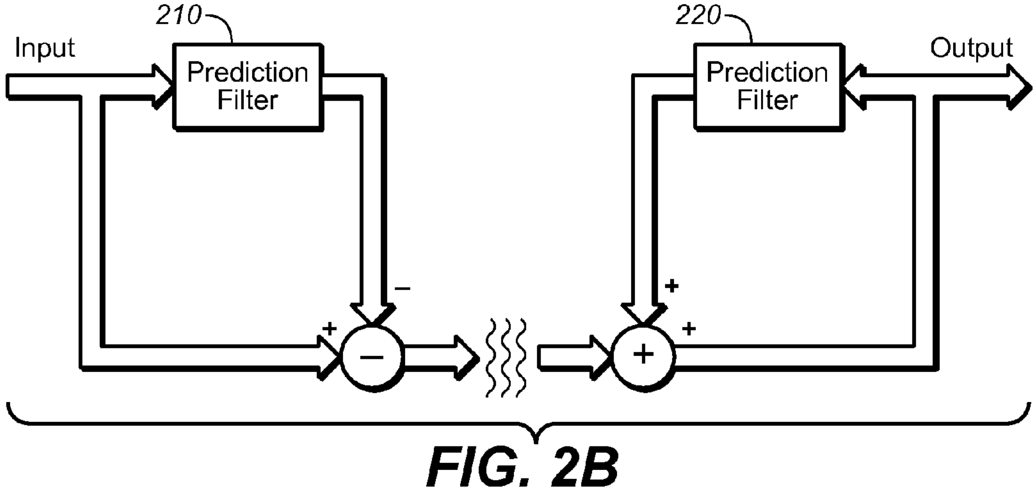
Figure 2C:
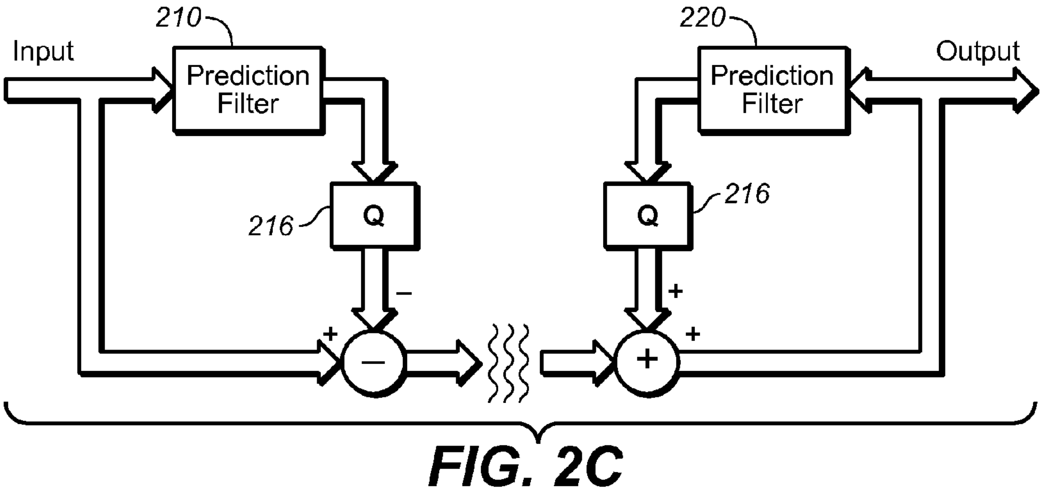
Figure 2D:
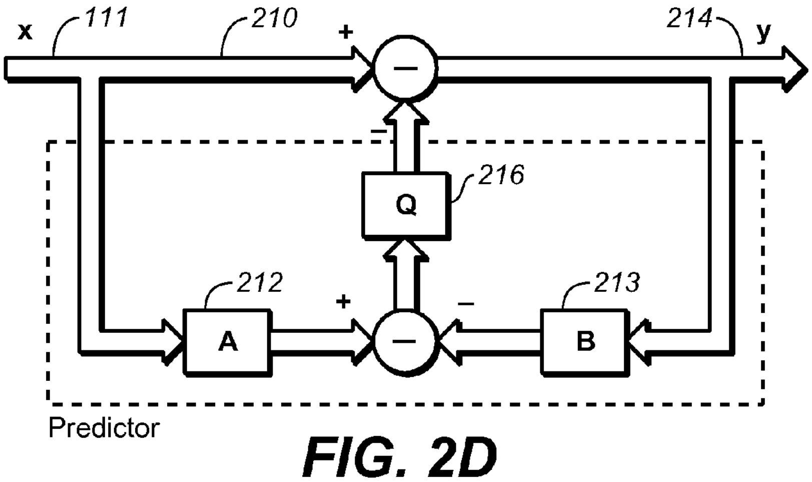
Figure 2E:
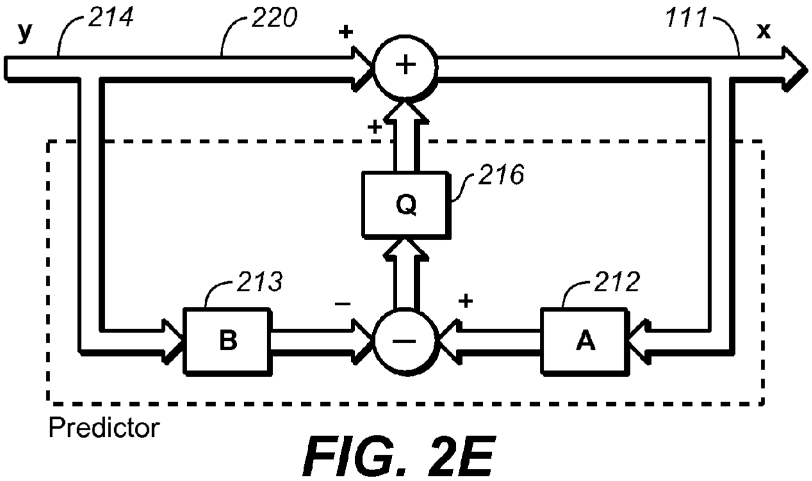
Figure 3A:
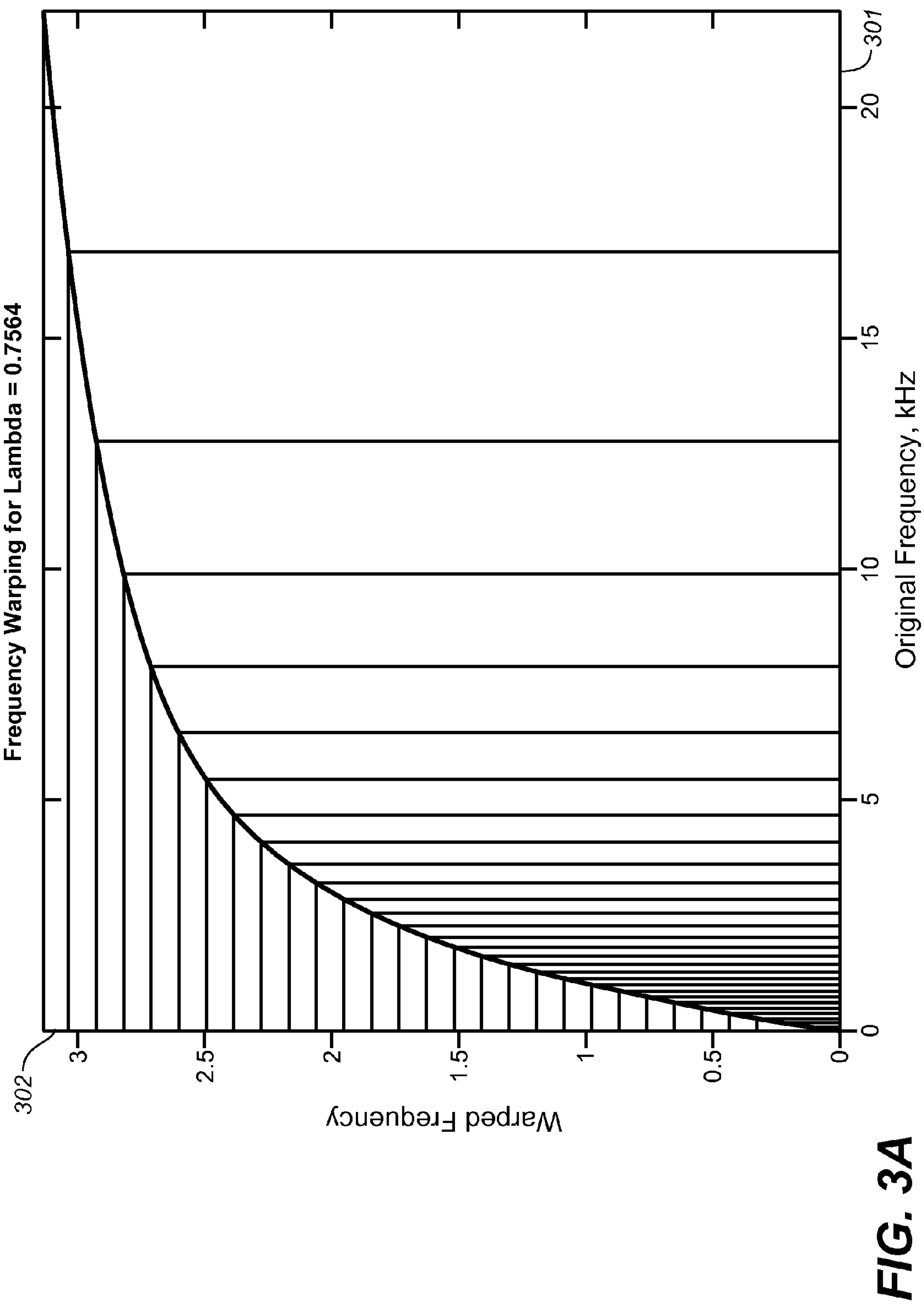
Figure 3B:
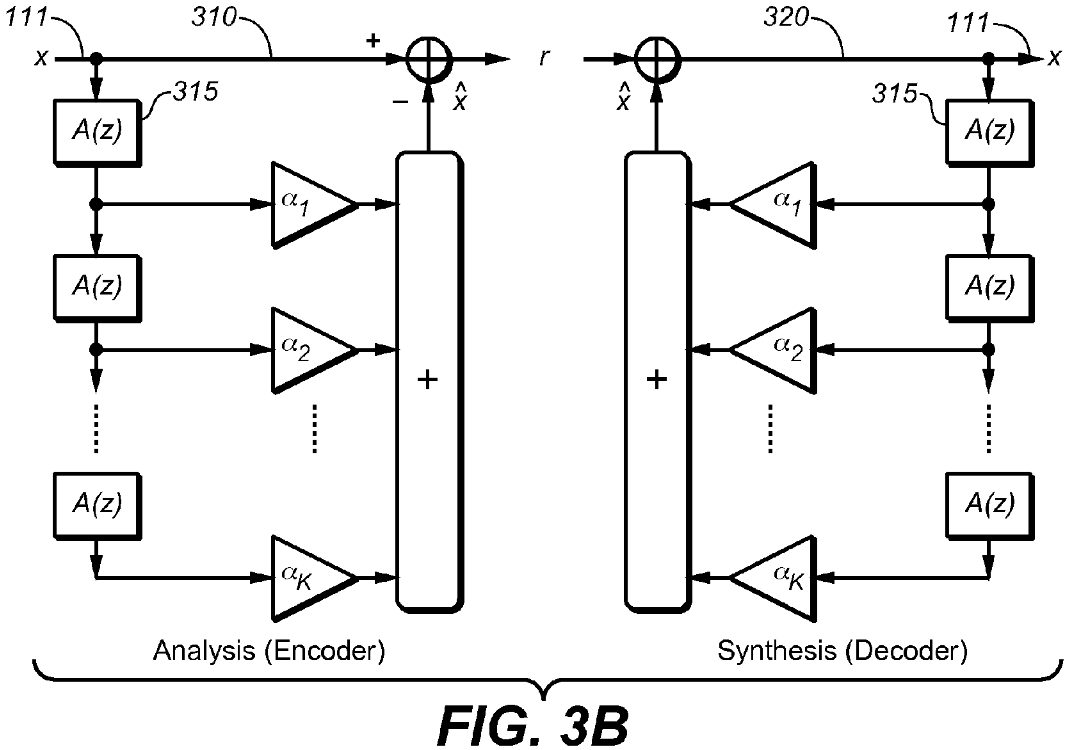
Figure 4:
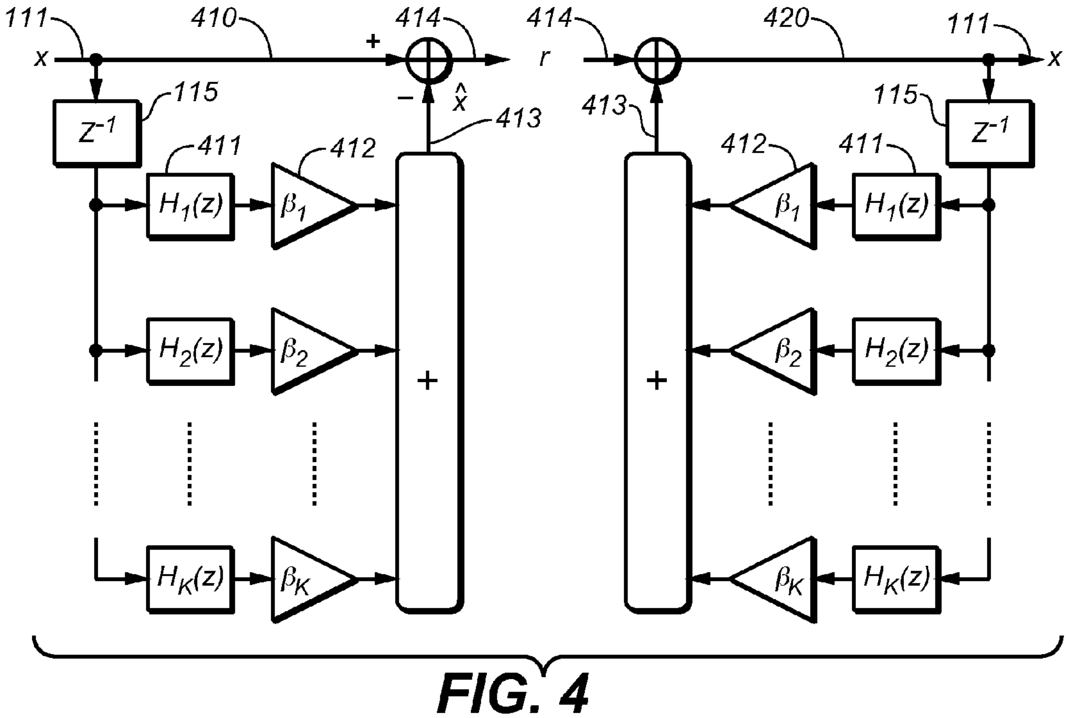
Figure 3C:
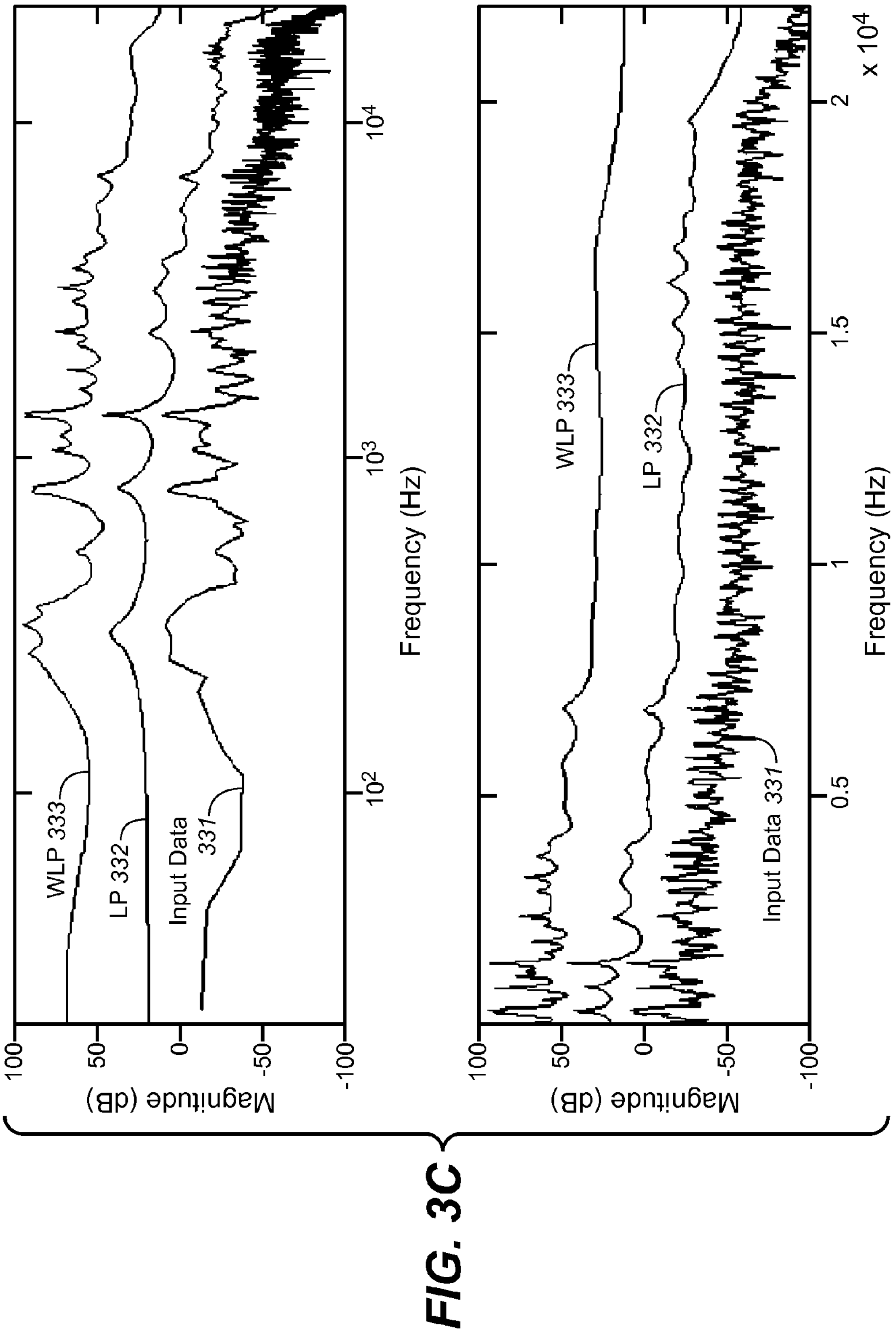
Figure 5A:
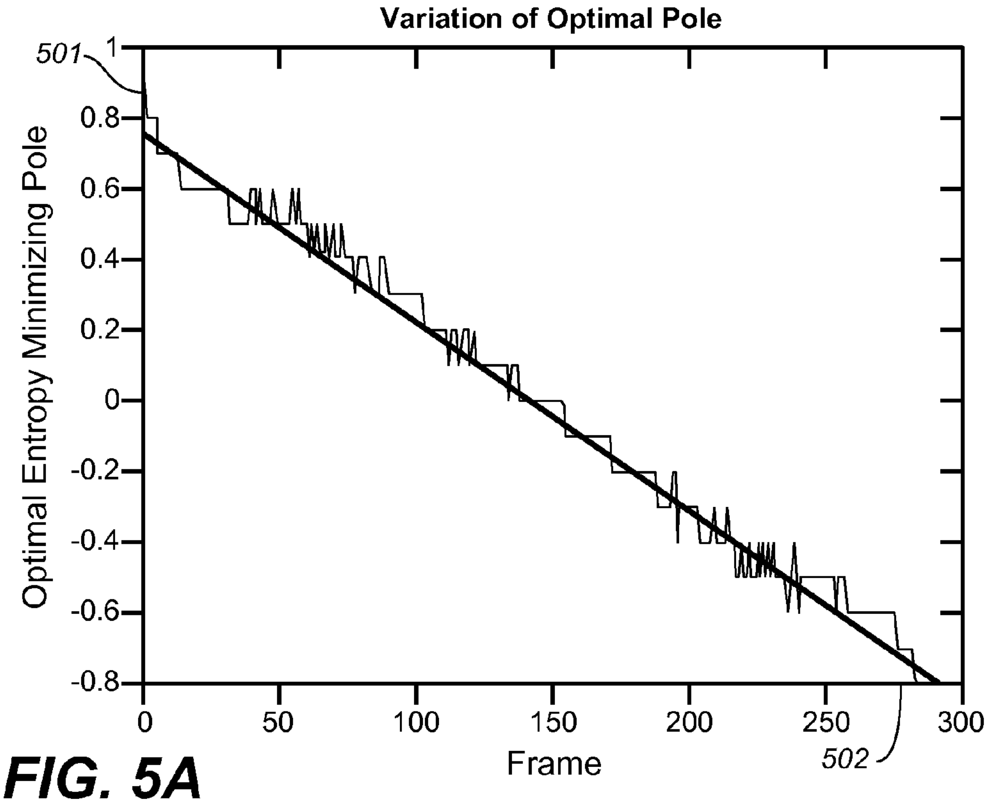
Figure 5B:
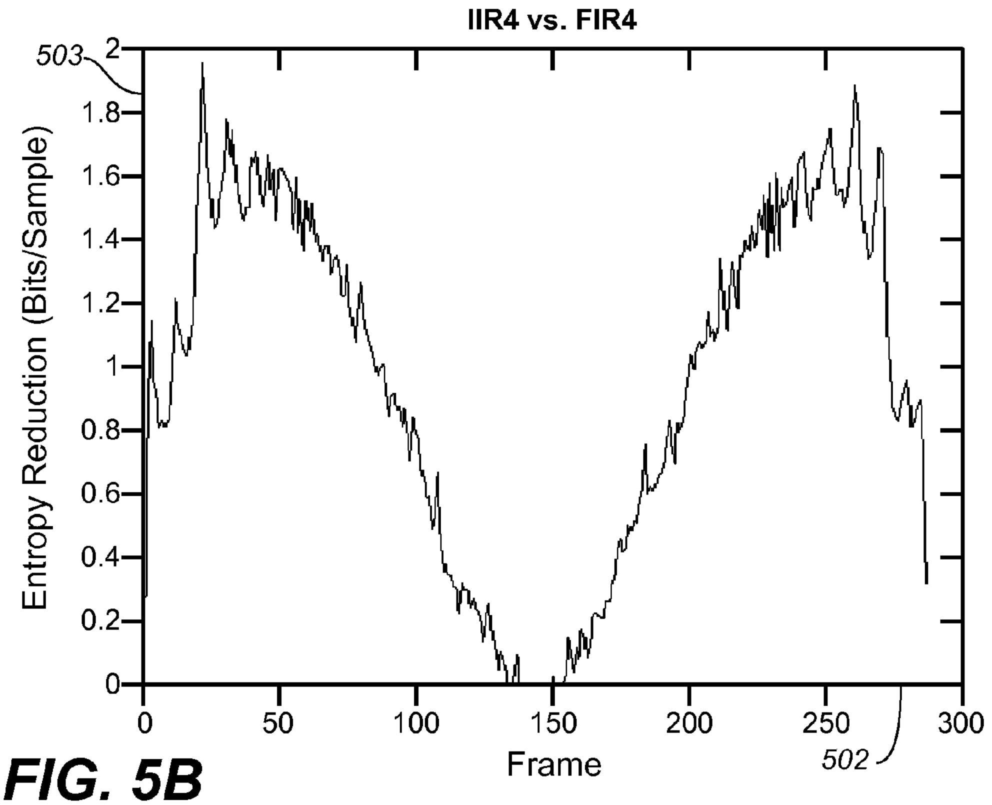
Figure 5C:
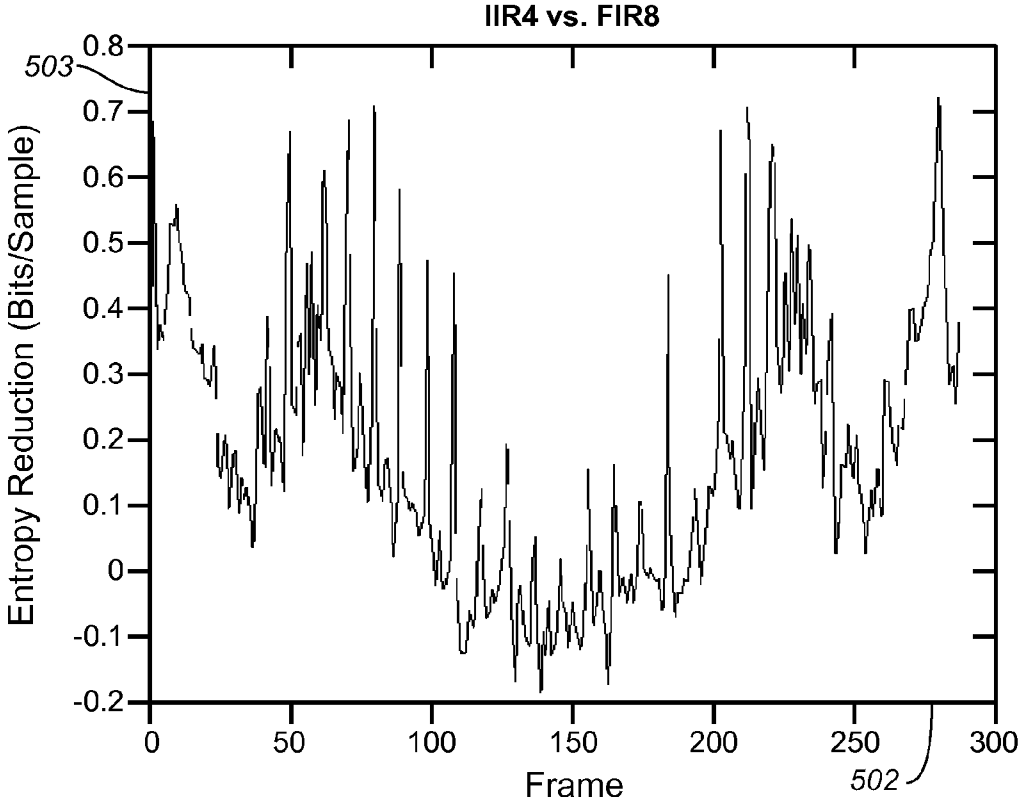
Figure 6:
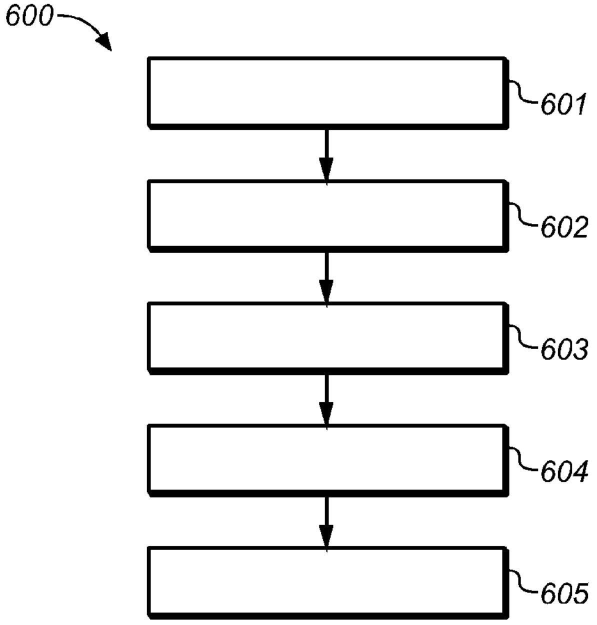

The invention is explained below in an exemplary manner with reference to the accompanying drawings, wherein FIG. 1*a* shows an example short-term spectrum of an audio signal comprising an excerpt of music;

FIG. 1*b* shows a block diagram of an example encoder and decoder using linear prediction;

FIG. 2*a* illustrates example spectra of an audio signal and of prediction error signals determined using FIR prediction and IIR prediction, respectively;

FIGS. 2*b* and 2*c* show block diagrams of example encoders and decoders using linear prediction;

FIGS. 2*d* and 2*e* show block diagrams of an example encoder and decoder using IIR based linear prediction, respectively;

FIG. 3*a* illustrates the concept of frequency warping;

FIG. 3*b* illustrates block diagrams of an example encoder and decoder using warped linear prediction (WLP);

FIG. 3*c* shows example prediction results obtained using linear prediction and warped linear prediction;

FIG. 4 shows block diagrams of an example encoder and decoder using linear prediction based on Laguerre filters;

FIG. 5*a* illustrates an experimental relationship between example adjustable pole parameters and signal frequency such that entropy of the signal is minimized;

FIGS. 5*b* and 5*c* illustrate example entropy reductions which are achievable when using IIR based linear prediction; and FIG. 6 shows a flow chart of an example method for determining the filter coefficients of an adjustable FIR/IIR based linear predictor.

DETAILED DESCRIPTION

The following aspects are described in the context of an audio signal. It should be noted that the aspects described in the present document are also applicable to prediction-based encoding of other types of signals, e.g. of image signals such as lines or columns of an image frame. In particular, the aspects described in the present document are applicable to lossless audio coding, as well as to lossless image coding.

As outlined in the background section, linear prediction is frequently used to reduce the entropy of an input audio signal, thereby yielding a prediction error signal having reduced entropy. In other words, linear prediction is directed at removing redundancies from the input audio signal, thereby yielding a decorrelated prediction error signal. If the values of future audio samples of the input audio signal can be estimated, then only the rules of prediction need to be transmitted along with the difference between the estimated signal and the actual signal, i.e. along with the prediction error signal. The prediction is typically performed by a so called decorrelator (so called because when optimally adapted there is no correlation between the currently transmitted sample of the prediction error signal and its previous samples).

FIG. 1*a* shows the short-term spectrum 100 of an example input audio signal (e.g. an excerpt of a music track). It can be seen that the spectrum 100 is not flat and it is an objective of the decorrelator to flatten the spectrum 100 using prediction techniques, thereby yielding coding gains. Ideally the decorrelator yields a prediction error signal having a flat spectrum 101, i.e. a prediction error signal which essentially corresponds to white noise. The Gerzon-Craven theorems show that the level of the optimally decorrelated prediction error signal is given by the average of the original signal spectrum when plotted as decibels versus linear frequency. As illustrated in FIG. 1*a* by the flat spectrum 101, this decibel average can have significantly less power than the original audio signal, thereby yielding to a reduction in data rate when encoding the prediction error signal compared to encoding the input audio signal. The power reduction achieved by the (optimal) decorrelator represents the information content of the input audio signal as defined by Shannon.

FIG. 1*b* illustrates the block diagram of an example FIR based decorrelator 110 (or encoder) and a corresponding example FIR based re-correlator 120 (or decoder). The decorrelator 110 makes use of an FIR prediction filter comprising a plurality of delay units $z^{-1}$ 115 and a plurality of filter coefficients $a_k$ 112, with k=1, . . . , K, typically K>1. A sample of the input audio signal x 111 is predicted based on a plurality of previous samples of the input audio signal x 111 using the plurality of filter coefficients $a_k$ 112, thereby yielding a sample of the predicted or estimated audio signal $\hat{x}$ 113. The difference between the sample of the input audio signal 111 and the estimated audio signal 113 yields a corresponding sample of the prediction error signal r 114 (also referred to as the residual signal). The residual signal 114 typically exhibits reduced entropy compared to the input audio signal 111. The residual signal 114 may be encoded using an appropriate entropy-coding scheme (e.g. using a Rice code, or Huffman coding, or Arithmetic coding), thereby providing a lossless audio coding scheme.

The plurality of filter coefficients $a_k$ 112 may be determined by the decorrelator 110 on a frame-by-frame basis using the samples of a frame of the input audio signal 111. In particular, the plurality of filter coefficients $a_k$ 112 may be determined such that the mean squared energy of the prediction error signal 114 is reduced (minimized). This may be achieved in an efficient manner using the Levinson-Durbin algorithm.

As such, a lossless audio coder may be provided by first removing the redundancy from the input audio signal 111 (e.g. using linear prediction techniques) and by then coding the resulting prediction error signal 114 with an efficient entropy-coding scheme. The encoded signal comprises for each frame of the input audio signal 111 a representation of the plurality of filter coefficients $a_k$ 112 and the entropy-encoded samples of the frame of the prediction error signal 114.

The re-correlator 120 (also referred to as the decoder) performs corresponding steps to the decorrelator 110. In particular, the re-correlator 120 uses the same FIR filter comprising the same plurality of filter coefficients $a_k$ 112 to reconstruct the input audio signal 111 from the residual audio signal r 114.

The degree to which an input audio signal can be "whitened" depends on the content of the input audio signal 111 and on the complexity (e.g. the number K of coefficients and/or the structure) of the prediction filter. Infinite complexity (e.g. an infinite number K of filter coefficients) could theoretically achieve a prediction at the entropy level 101 shown in FIG. 1*a*. However, all the coefficients that define such a decorrelator 110 would then need to be transmitted to the decoder 120 (in addition to the prediction error signal 114) to reconstruct (recorrelate) the input audio signal 111. There is therefore a need to obtain a balance between predictor complexity (e.g. the number K of filter coefficients and/or the type of the prediction filter, e.g. FIR or IIR) and performance.

Typically, lossless audio coders (including the MPEG-4 ALS, Audio Lossless Coding, coder) make use of an FIR-based predictor or decorrelator 110. IIR-based predictors or decorrelators 110 may be beneficial, in situations where the control of peak data rates is important. A further situation where IIR-based decorrelators 110 may be beneficial is where the spectrum 100 of the input audio signal 111 exhibits a relatively wide dynamic range. In such a situation, compression gains may be expected, in particular for relatively high sampling rates. By way of example, IIR-based predictors show an improvement over FIR-based predictors of approx. 0.2 bits/sample (for audio signals at a 44.1 kHz sampling rate) and an improvement of more than 1 bit/sample (for audio signals at a 96 kHz sampling rate, which are band-limited to 32 kHz). As such, it can be seen that IIR-based predictors are increasingly beneficial for encoding input audio signals 111 having an increasingly high ratio of sampling rate over signal bandwidth.

FIG. 2*a* illustrates the spectral level 201 of an example input audio signal 111, the spectral level 203 of an example prediction error signal 114 obtained using an FIR decorrelator comprising K=8 coefficients (FIR8) and the spectral level 202 of an example prediction error signal 114 obtained using an IIR decorrelator comprising a length of four (IIR4). From FIG. 2*a*, it can be observed that the IIR predictor is able to flatten the prediction error signal better and it can be expected that compared to an FIR predictor, the IIR predictor provides an "improved" spectral flattening at relatively high sampling rates. The degree of "improvement" may be proportional to the "input sampling frequency". The reason for this is that for higher sampling rates, the spectrum of the input audio signal 111 rolls-off at frequencies lower than the Nyquist frequency (which is at half of the sampling frequency). This implies that the spectrum of the prediction error signal created with an FIR filter will also roll-off at significantly lower frequencies than the Nyquist frequency. On the other hand, the spectrum of the prediction error signal created with an IIR filter will typically be flat up to the Nyquist frequency.

FIG. 2*b* shows an example block diagram of a conventional prediction architecture, where in an encoder 210 a prediction filter is used to determine an estimated signal which is subtracted from the input signal, thereby yielding the prediction error signal. At the decoder 220, the same prediction filter may be used to reconstruct the input signal. The prediction architecture of FIG. 2*b* may be used for lossy IIR-based prediction coders, however, the architecture of FIG. 2*b* typically cannot be used for lossless compression. This is due to the fact that the output of the prediction filter 220 in FIG. 2*b* typically has a longer word length than the input signal because of the multiplication by fractional coefficients. As the transmitted data rate depends on the total word length, extending the word size would be counterproductive.

This problem may be overcome by quantizing the output of the prediction filter at the encoder 210, i.e. by quantizing the estimated signal using a quanitzer 216. This is illustrated in FIG. 2*c*, where the output of the prediction filter at the encoder 210 is quantized so that the transmitted prediction error signal has the same word length as the input signal. By symmetry, the decoder 220 can recover the original signal despite the fact that the side chain is nonlinear. However, the use of a quanitzer 216 assumes that the predictors of the decoder 220 and the encoder 210 produce outputs which, when requantized, correspond exactly. This may be achieved with an FIR filter, as the output of an FIR filter can be computed exactly using finite-word length arithmetic. In contrast, IIR filters with fractional coefficients cannot be exactly implemented since the representation of the recirculating signal requires an ever-increasing word length. The IIR output is thus dependent on the rounding behavior of the underlying arithmetic, and it may not be ensured that the rounding behavior does not affect the quantized output of the decorrelators. Consequently, there is the risk that a decoder 220 implemented on hardware (such as a computer or a DSP chip) which is different from the hardware of the encoder 210 does not reproduce exactly the same bits and by consequence the compression scheme is not lossless.

A possible architecture for overcoming this technical problem is illustrated in FIGS. 2*d* and 2*e* for the encoder 210 and the corresponding decoder 220, respectively. As the input and output signals are both quantized and as filters A 212 and B 213 are both FIR filters, the input to the quantizer Q 216 is a finite precision signal, and the quantization can therefore be specified precisely. On the other hand, because of the recirculation through filter B 213, the total response of the predictor in the encoder 210 and in the decoder 220 is IIR. As such, the architecture of FIGS. 2*d* and 2*d* illustrates an IIR predictor which is portable across different hardware platforms, even when used for lossless encoding.

The encoder 210 of FIG. 2*d* determines a prediction error signal 214 from the input signal 111. The prediction error signal 214 typically has a reduced entropy compared to the input signal 111 and can be entropy encoded (e.g. using a Rice code, or Huffman coding, or Arithmetic coding).

For FIR-based predictors, optimal prediction coefficients can be obtained using the Levinson-Durbin algorithm. For IIR-based predictors, there is no such efficient algorithm for obtaining the optimal IIR prediction coefficients. The present document addresses the technical problem of determining the coefficients of an IIR-based decorrelator in an efficient manner such that the entropy of the prediction error signal is reduced (e.g. minimized).

It is proposed in the present document to make use of so called Warped Linear Prediction (WLP) and/or Laguerre Linear Prediction (LLP) as a preprocessor to determine the coefficients of IIR-based decorrelators. It is shown that prediction filters which have been determined using a WLP and/or LLP scheme can be transformed into filters A 212 and B 213 of an IIR-based decorrelator (as shown in FIG. 2*d*). Furthermore, an efficient scheme for determining the coefficients of the filters A 212 and B 213 is described.

Frequency warped processing may be used to process audio signals according to the frequency resolution of the human auditory system. For this purpose, the frequency range of an input signal may be mapped to a warped frequency range, thereby modeling the frequency resolution of the human auditory system. This is illustrated in FIG. 3*a*, where it is shown how an original frequency range 301 may be warped into a warped frequency range 302. By way of example, a Bark scale may be used to warp the original frequency range. In the context of FIR-based linear prediction, frequency warping may be implemented by replacing the delays 115 of an FIR prediction filter with an allpass filter $$A(z) = \frac{z^{-1} - \lambda}{1 - \lambda z}; \ |\lambda| < 1,$$

wherein the parameter λ defines the pole of the allpass filter. In case of a pole parameter λ=0 conventional FIR-based linear prediction is implemented. For an input signal at a sampling rate of 44.1 hHz, a Bark scale mapping is obtained with a pole parameter λ=0.756.

FIG. 3*b* illustrates a modified encoder 310 and a modified decoder 320, where the delay units 115 have been replaced by allpass filters A(z) 315. The optimal coefficients of the allpass filters A(z) 315 for a fixed pole parameter λ may be determined using the Levinson-Durbin algorithm. FIG. 3*c* illustrates how a WLP based encoder 310 approximates an input signal 111. FIG. 3*c* shows the spectrum 331 of an input signal 111, the spectrum 332 of an estimated signal determined using an FIR-based linear predictor and the spectrum 333 of an estimated signal determined using WLP. It can be seen that WLP exhibits improved modeling quality in the perceptually relevant low frequency range (using e.g. a pole parameter of λ=0.756 for an input audio signal 111 at a sampling rate of 44.1 kHz).

A problem of WLP is that WLP provides prediction error signals which are not whitened in the original frequency domain. This problem may be overcome by whitening the prediction error signal using a residual post-filter $$W^{-1}(z) = \frac{1 - \lambda z^{-1}}{\sqrt{1 - \lambda^2}},$$

or alternatively, optional WLP coefficients can be obtained using a pre-filter $$W(z) = \frac{\sqrt{1 - \lambda^2}}{1 - \lambda z^{-1}},$$

wherein the pre-filter is typically not applied in the prediction filtering operation. This means that the pre-filter W(z) may be used when determining the optimal prediction coefficients $a_k$ and the pole parameter λ. However, when performing linear prediction filtering as shown in FIG. 3*b*, the determined filter coefficients may be used without the additional pre-filter W(z). In other words, the residual signal r may be determined as shown in FIG. 3*b* without using the additional pre-filter W(z), but only using the coefficients $a_k$, k=1, . . . , K and the pole parameter λ, which have been determined using the additional pre-filter W (z).

While the use of a post-filter or a pre-filter whitens the prediction error signal, it is typically not possible to implement a synthesis filter at the decoder 320 because of delay-free loops. This technical problem may be solved by adding an explicit delay unit 115 to the encoder and the decoder, thereby yielding a so called Laguerre Linear Prediction (LLP) scheme which is illustrated in FIG. 4 showing an encoder 410 and a corresponding decoder 420. The pre-filtering using the whitening filter W(z) may also be absorbed into the prediction structure, thereby yielding so called Laguerre filters 411

$$H_k(z) = \frac{\sqrt{1 - \lambda^2}}{1 - z^{-1}\lambda}\left(\frac{z^{-1} - \lambda}{1 - z^{-1}\lambda}\right)^{k-1} = W(z)(A(z))^{k-1};$$

with k=1, 2, . . . , K, wherein for a pole parameter λ=0, the encoder and decoder structure of FIG. 4 correspond to an FIR-based linear predictor.

The encoder 410 receives an input signal 111 and determines an estimated signal 413 using the decorrelator comprising the delay unit 115, the Laguerre filters 411 and respective filter coefficients 412 (referred to as LLP coefficients). The estimated signal 413 is subtracted from the input signal 111, thereby yielding the prediction error signal 414. The corresponding decoder 420 performs the corresponding operations to reconstruct the input signal 111. In particular, the decoder 420 receives the LLP coefficients 412 and uses a delay unit 115, the Laguerre filters 411 and the received LLP coefficients 412 to reconstruct the input audio signal 111 from the prediction error signal 414.

One method for determining optimal LLP coefficients $\beta_k$; with k=1, 2, . . . , K is as follows:

Consider the input signal x 111 and a set of K regressor signals $y_k$ (with k=1, . . . , K) at the output of the K Laguerre filters 411. The estimated signal $\hat{x}$ 413 may be determined from the regressor signals $y_k$ as $$y_k = \sum_{k=1}^{K} \beta_k \cdot y_k,$$

where $\beta_k$ are the LLP coefficients 412.

The LLP coefficients 412 are usually optimized to minimize the mean squared energy of the prediction error signal r414 (within the frame for which the LLP coefficients 412 are determined). The regressor signals $y_k$ can be derived from the input signal 111 by linear filtering, thus $Y_k(z)=z^{-1}H_k(z)\cdot X(Z)$, where X(z) and $Y_k(z)$ are the z-transforms of x and $y_k$, respectively, and where $H_k(z)$ are stable and causal IIR filters.

In matrix notation, the optimal LLP coefficients $\beta_k$ are given by the normal equations $Q\beta=P$, where $\beta$ is a vector comprising the optimal LLP coefficients $\beta_k$, and where the elements of the matrix Q and the vector P are given by $Q_{k,l}=\Sigma y_l y_k$ and $P_k=\Sigma x y_k$, i.e. where the matrix Q reflects the correlation between the different regressor signals $y_k$ and where the vector P reflects the correlation between the input signal x and the different regressor signals $y_k$.

Hence, the predictor coefficients $\beta_k$ 412 may be determined in an efficient manner under the assumption of a fixed pole parameter λ using e.g. a Levinson-Durbin algorithm. This is particularly true for a pole parameter λ=0, for which the Laguerre filters 411 become delays, i.e. $H_k(z)=z^{-k}$, and for which the optimal LLP coefficients $\beta_k$; with k=1, 2, . . . , K correspond to the coefficients of an FIR prediction filter.

As will be shown below, the encoder 410 and decoder 420 may be transformed in accordance to the encoder 210, 220 of FIGS. 2*d* and 2*e*, respectively. This means that the encoder 410 and decoder 420 effectively provide an IIR based decorrelator when using a pole parameter λ which is different from zero.

The use of Laguerre filters 411 for implementing a decorrelator has several advantages. The encoder/decoder of FIG. 4 can be implemented using the predictor structure of FIGS. 2*d* and 2*e*, wherein perfect reconstruction is guaranteed even in case of finite word length arithmetic. Furthermore, stability of the used synthesis filter is guaranteed for such Laguerre (and possibly Kautz) filters. In addition, efficient autocorrelation based methods exist (similar to the ones used in linear prediction) for deriving optimal filter coefficients 412.

Furthermore, the prediction error signal 414 exhibits spectral flatness on the original frequency scale 301. In this context, the pole parameter λ (which defines the pole of the allpass filter) provides an extra degree of freedom. It is proposed in the present document to use this extra degree of freedom to provide for an additional reduction (e.g. a minimization) of the entropy of the prediction error signal 414. By doing this, an optimal combination of FIR/IIR filters may be determined for each block or frame of the input audio signal 111.

As a further advantage it should be noted that the encoder 410 of FIG. 4 preserves desirable qualities of WLP. In particular, the encoder 410 may provide improved perceptual noise shaping for cascaded lossy data compression with a lossless kernel. This is particularly relevant when using a lossless codec, such as TrueHD, in a lossy mode of operation. In the lossy mode of operation, the quantization noise is shaped according to prediction parameters which model the spectral envelope of the signal (similar to spectral noise shaping as used in linear prediction based speech codecs). Warped linear prediction typically models spectral envelopes perceptually better, and is therefore better suitable for lossy coding. As such, the encoder 410 (which preserves the properties of WLP) provides an improved perceptual noise shaping.

When using a pole parameter λ=0, the methods described in the present document provide an FIR prediction filter. As the pole parameter provides a further degree of freedom, it can be stipulated that, for an equal number of prediction coefficients, the IIR predictors which are determined using the methods described in the present document should provide an entropy reduction which is at least as good as the corresponding FIR predictor (with a pole parameter λ=0).

As indicated above, the pole parameter λ may be used to reduce the entropy of the prediction error signal 414. This may be achieved e.g. by using a brute force approach. By way of example, the pole parameter λ (and the corresponding pole of the allpass filter A(z)) may be varied from −0.9 to +0.9 and the pole parameter λ may be selected, which produces a prediction error signal 414 with the least entropy. In an embodiment, for every analysis frame of the input audio signal 111, the pole parameter λ may be varied from −0.9 to 0.9 in steps of 0.1. For each pole parameter λ, the optimal LLP coefficients 412 are determined and the residual signal 414 and its entropy are determined. Then, the pole parameter λ for which the entropy of the residual signal 414 is reduced (e.g. is minimal) may be selected, and the (entropy encoded) residual signal 414 and the LLP coefficients 412 for the selected pole parameter λ may be transmitted to the decoder 420.

It should be noted that more efficient schemes than the above mentioned brute force approach for selecting a pole parameter λ which reduces (e.g. minimizes) the entropy of the prediction error signal 414 may be provided and are discussed below.

The determined LLP coefficients $\beta_k$ 412 may be transformed into filter coefficients for the filters A 212 and B 213 which are used by the encoder 210 and decoder 220 of FIGS. 2*d* and 2*e* (used e.g. in the Dolby True HD coder). This is beneficial, as it allows the reuse of an existing encoder/decoder structure, as well as the reuse of quantization and coding routines. In case of filters A 212 and B 213 each comprising four filter coefficients and in case of K=4, the filters 212, 213 may be determined as $$A=\begin{bmatrix} 4\lambda+R\beta_1-R\lambda\beta_2+R\lambda^2\beta_3-R\lambda^3\beta_4 \\ -6\lambda^2-R(3\lambda)\beta_1+R(1+2\lambda^2)\beta_2-R(2\lambda+\lambda^3)\beta_3+R(3\lambda^2)\beta_4 \\ 4\lambda^3+R(3\lambda^2)\beta_1-R(2\lambda+\lambda^3)\beta_2+R(1+2\lambda^2)\beta_3-R(3\lambda)\beta_4 \\ -\lambda^4-R\lambda^3\beta_1+R\lambda^2\beta_2-R\lambda\beta_3+R\beta_4 \end{bmatrix};$$

where $$R=\sqrt{1-\lambda^2},$$

and $$B=\begin{bmatrix} 4\lambda \\ -6\lambda^2 \\ 4\lambda^3 \\ -\lambda^4 \end{bmatrix}.$$

It should be noted that in case of a pole parameter λ=0, only the FIR filter A 212 is active. The transformation formulas for other values of K may be determined in an analogous manner.

The benefits of using an IIR-based decorrelator have been tested using a sine sweep ranging from 0 to 24 kHz, sampled with 16 bits/sample and with a sampling rate of 48 kHz. The performance of FIR-based decorrelators using an FIR predictor of order 4 (FIR4) and an FIR predictor of order 8 (FIR8) were compared to the performance of an IIR-based decorrelator using an IIR predictor of order 4 (IIR4). The tests were performed for different frame sizes of the input audio signal 111, i.e. for different predictor analysis frame sizes. The example results are shown in Table 1.

TABLE 1

| Frame size (samples) | Max. Entropy Reduction with IIR FIR4 vs. IIR4 (bits/sample) | Mean Entropy Reduction with IIR FIR4 vs. IIR4 (bits/sample) | Max. Entropy Reduction with IIR FIR8 vs. IIR4 (bits/sample) | Mean Entropy Reduction with IIR FIR8 vs. IIR4 (bits/sample) |
|---|---|---|---|---|
| 40 | 1.6039 | 0.2359 | 1.7229 | −0.4475 |
| 240 | 1.4311 | 0.6929 | 0.4798 | 0.0373 |
| 440 | 1.7837 | 0.9360 | 0.8345 | 0.1526 |
| 640 | 1.8548 | 0.9645 | 0.8050 | 0.2097 |
| 840 | 1.9574 | 0.9617 | 0.7204 | 0.1833 |
| 1040 | 1.8294 | 0.9385 | 0.7162 | 0.1420 |
| 1240 | 1.7157 | 0.8974 | 0.5511 | 0.0964 |

It can be seen that in most of the cases, a reduction of the entropy of the prediction error signal can be achieved when using an IIR predictor.

Furthermore, it has been observed using a sine sweep test that the optimal pole parameter λ has an almost linear relationship to the frequency of the input audio signal 111. This is illustrated in FIG. 5*a*, where it can be seen that the optimal pole parameter λ501 (i.e. the pole parameter which provides LLP coefficients 412 which minimize the entropy of the prediction error signal 414) decreases (linearly) with increasing frequency 502 of the input audio signal 111. In the illustrated example, the input audio signal 111 comprises a sine sweep, therefore the x-axis 502 can be thought of as the frequency increasing with time. This observation can be used to provide efficient schemes for determining the pole parameter λ which provides (almost optimal) LLP coefficients 412. It should be noted that for a particular frequency (around frame number 150), the optimal pole parameter λ501 is zero, thereby indicating that for an input signal 111 at this frequency, the use of an FIR predictor is optimal.

FIG. 5*b* illustrates the entropy reduction (measured in bits/sample) which is possible when using an IIR4 predictor compared to the situation when using a FIR4 predictor. The input audio signal 111 comprises a sine sweep such that the x-axis 502 may be viewed as the frequency of the input audio signal 111. It can be seen that the entropy reduction 503 which may be achieved when using an IIR predictor varies with the frequency of the input signal. A similar observation can be made in FIG. 5*c* where the entropy reduction (measured in bits/sample) which is possible when using an IIR4 predictor compared to the situation when using a FIR8 predictor is illustrated. It should be noted that in the case of FIG. 5*b* only four filter coefficients are determined and transmitted (for the FIR4 and for the IIR4 case), whereas in the case of FIG. 5*c*, the FIR8 requires the determination and transmission of eight filter coefficients.

As indicated above, the observation of FIG. 5*a* suggests that the pole parameter λ may be determined in an efficient manner (compared to the brute force approach outlined above). In particular, a look-up table may be determined offline, wherein the look-up table provides a mapping between an estimated frequency of a frame of the input audio signal 111 and a corresponding pole parameter λ which minimizes the entropy of the prediction error signal 414. The look-up table may be determined based on a training set comprising a plurality of input audio signals 111. The look-up table will typically have a mapping distribution similar to the one illustrated in FIG. 5*a*.

The encoder 410 may be configured to use the predetermined look-up table to determine the pole parameter λ which is to be used to calculate the LLP coefficients 412 for a particular frame of an input audio signal 111. The encoder 410 may employ a frequency estimation method, and estimate the (dominant) frequency content of the particular frame of the input signal 111. By way of example, the encoder may employ a low-order linear predictor and estimate the spectral envelope of the particular frame of the input audio signal 111. The estimated (dominant) frequency may correspond to the peak of the spectral envelope. Once the dominant frequency is estimated, the encoder 410 may look-up the corresponding optimal entropy minimizing pole parameter λ from the look-up table. This entropy minimizing pole parameter λ may be used to determine optimal LLP coefficients 412 which minimize the power of the corresponding frame of the prediction error signal 414 (using a Levinson-Durbin type algorithm). The determined LLP coefficients 412 may optionally be mapped to the prediction structure of FIG. 2*d*, in order to make use of existing Dolby TrueHD quantization and coding techniques.

It should be noted that various other methods may be used to determine the pole parameter λ. In particular, a hybrid method for determining the optimal entropy minimizing pole parameter λ may make use of a combination of a look-up table and a brute force search. For instance, a look-up table may be used to determine a first estimate of the optimal pole parameter λ. Furthermore, the looked-up value of λ may be refined by evaluating additional surrounding values of the looked-up value of λ (and possibly λ=0). Finally, the value for λ may be chosen which minimizes entropy. For example, if the looked-up value of λ is 0.7, one could evaluate other value of λ in the range of 0.6 and 0.8 in addition to 0.7 (and possibly the value 0, in order to verify whether the FIR predictor provides a better solution than the IIR predictor).

FIG. 6 illustrates an example method 600 for determining an IIR prediction filter for performing decorrelation of an input signal. In step 601, a frame of samples of the input signal 111 is selected for determining an IIR prediction filter. In step 602, a dominant frequency of the selected frame is estimated. The estimated frequency may be used to determine a pole parameter λ (step 603), e.g. using a predetermined look-up table. Using the pole parameter, LLP prediction coefficients may be determined (step 604). The LLP prediction coefficient may optionally be transformed into an explicit FIR and IIR filter representation comprising e.g. filter A 212 and filter B 213 (step 605).

In the present document, a method for determining an IIR-based decorrelator has been described. The method may be implemented in an efficient manner and allows for the determination of IIR filter prediction filter coefficients which minimize the entropy of the prediction error signal. As such, the method enables the implementation of audio coding schemes having increased coding gains. The IIR-based decorrelator may be used in conjunction with an entropy encoder of the prediction error signal to provide a lossless audio coder. Furthermore, the method may be used to adaptively switch between FIR and IIR based linear prediction on a frame-by-frame basis, in order to minimize the entropy of the prediction error signal. In addition, the IIR-based decorrelator is compliant with existing Dolby True HD coders, thereby enabling the reuse of already deployed Dolby True HD decoders.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

The invention claimed is:

1. A method, performed by an audio signal processing device, for determining a general prediction filter for a frame of an input signal, the z-transform of the general prediction filter being representable as a ratio of a first and second finite impulse response, referred to as FIR, filter comprising first and second sets of coefficients, respectively, and approximating the z transform of an intermediate filter, the method comprising:

determining an adjustable pole parameter and a plurality of FIR coefficients for the intermediate filter, such that an entropy of a frame of a prediction error signal which is derived from the frame of the input signal using the intermediate filter defined by the pole parameter and the plurality of FIR coefficients is reduced, wherein the intermediate filter comprises an FIR filter whose z variable is replaced by the z-transform of an allpass filter, the allpass filter exhibiting a pole defined by the adjustable pole parameter, wherein determining the pole parameter and the plurality of FIR coefficients comprises:

estimating the entropy of the frame of the prediction error signal obtained using the intermediate prediction filter defined by a set pole parameter and the plurality of FIR coefficients determined using the set pole parameter;

repeating determining the plurality of FIR coefficients and estimating the entropy for a plurality of differently set pole parameters; and selecting the pole parameter from the plurality of differently set pole parameters which reduces the estimated entropy of the frame of the prediction error signal; and mapping the determined pole parameter and the determined plurality of FIR coefficients for the intermediate filter to the first and second sets of coefficients for the general prediction filter, whereby the general prediction filter is configured to exhibit an infinite impulse response when the adjustable pole parameter is not zero and a finite impulse response when the adjustable pole parameter is zero;

wherein one or more of determining an adjustable pole parameter and mapping the determined pole parameter are implemented, at least in part, by one or more hardware elements within the audio signal processing device.

2. The method of claim 1, wherein determining the pole parameter and the plurality of FIR coefficients comprises setting the pole parameter to a fixed first value; and determining the plurality of FIR coefficients using the set pole parameter.

3. The method of claim 1, wherein estimating the entropy of the frame of the prediction error signal comprises determining a probability distribution of the values of samples of the frame of the prediction error signal; and estimating the entropy based on a weighted sum of the probability distribution.

4. The method of claim 3, wherein the weighted sum of the probability distribution is given by $$\sum_i P_i \cdot \log_b(P_i),$$

with $P_i$, being the probability of the value i of a sample of the prediction error signal and with b being the base of the log function.

5. The method of claim 2, wherein setting the pole parameter to a fixed first value comprises estimating a dominant frequency of the frame of the input signal; and determining the first value based on the estimated dominant frequency.

6. The method of claim 5, wherein the first value is determined based on the estimated dominant frequency using a pre-determined look-up table; and the pre-determined look-up table provides a mapping between a plurality of frequency values and a corresponding plurality of pole parameter values.

7. The method of claim 5, wherein estimating a dominant frequency of the frame of the input signal comprises determining a spectral envelope of a spectrum of the frame of the input signal; and estimating the frequency of the frame of the input signal based on the spectral envelope.

8. The method of claim 1, wherein for a fixed pole parameter, determining the plurality of FIR coefficients comprises determining the plurality of FIR coefficients such that a mean squared power of the frame of the prediction error signal is reduced.

9. The method of claim 1, wherein for a fixed pole parameter, determining the plurality of FIR coefficients comprises for each tap of the general prediction filter, determining a frame of a regressor signal based on the frame of the input signal, thereby yielding a plurality of regressor signal frames;

determining an autocorrelation matrix Q based on the plurality of regressor signal frames;

determining a cross-correlation vector P based on the plurality of regressor signal frames and the frame of the input signal; and determining a FIR coefficient vector β comprising the plurality of FIR coefficients based on the normal equations Qβ=P.

10. The method of claim 1, wherein the z-transform of the intermediate prediction filter further comprises a pre-filter configured to whiten a spectrum of the prediction error signal, and optionally, an overall delay.

11. The method of claim 1, wherein the allpass filter comprises the allpass filter $$A(z) = \frac{z^{-1} - \lambda}{1 - \lambda z^{-1}};\ |\lambda| < 1$$

with λ being the pole parameter.

12. The method of claim 1, wherein the z-transform of the intermediate prediction filter is representable as $$\sum_{k=1}^{K} z^{-1}\beta_k H_k(z),$$

with k=1, . . . , K, with K>1 and with $$H_k(z) = \frac{\sqrt{1-\lambda^2}}{1-z^{-1}\lambda}\left(\frac{z^{-1}-\lambda}{1-z^{-1}\lambda}\right)^{k-1},$$

and with $\beta_k$, k=1, . . . , K being the plurality of FIR coefficients.

13. The method of claim 1, further comprising:

determining an estimate of the frame of the input signal using the determined general prediction filter;

determining a frame of a prediction error signal based on the estimated frame and the frame of the input signal;

encoding information indicative of the determined general prediction filter; and encoding the frame of the prediction error signal.

14. The method of claim 13, wherein the frame of the prediction error signal is encoded using an entropy encoder.

15. The method of claim 13, wherein the information indicative of the determined general prediction filter comprises the pole parameter.

16. A method according to claim 1, wherein the determined pole parameter and the determined plurality of FIR coefficients are mapped to the first and second sets of coefficients for the general prediction filter using formulas; and the formulas provide for an exact bi-directional transformation of the first and second sets of coefficients and of the determined pole parameter and the determined plurality of FIR coefficients.

17. An audio encoding device configured to determine a general prediction filter for a frame of an input signal, the z-transform of the general prediction filter approximating the z transform of an intermediate filter, and being representable as a ratio of a first and second FIR filter comprising first and second sets of coefficients, respectively, wherein the audio encoding device is configured to:

determine a pole parameter and the plurality of FIR coefficients, such that an entropy of a frame of a prediction error signal which is derived from the frame of the input signal using the intermediate filter defined by the pole parameter and the plurality of FIR coefficients is reduced, wherein the intermediate filter comprises an FIR filter whose z variable is replaced by the z-transform of an allpass filter, the allpass filter exhibiting a pole defined by the adjustable pole parameter, wherein the pole parameter and the plurality of FIR coefficients are determined by:

estimating the entropy of the frame of the prediction error signal obtained using the intermediate prediction filter defined by a set pole parameter and the plurality of FIR coefficients determined using the set pole parameter;

repeating determining the plurality of FIR coefficients and estimating the entropy for a plurality of differently set pole parameters; and selecting the pole parameter from the plurality of differently set pole parameters which reduces the estimated entropy of the frame of the prediction error signal; and map the determined pole parameter and the determined plurality of FIR coefficients for the intermediate filter to the first and second sets of coefficients for the general prediction filter, whereby the general prediction filter is configured to exhibit an infinite impulse response when the adjustable pole parameter is not zero;

wherein one or more of determining the pole parameter and mapping the determined pole parameter is performed, at least in part, by one or more hardware elements within the audio encoding device.

18. The audio encoding device of claim 17, further configured to:

determine an estimate of the frame of the input signal using the determined general prediction filter;

determine a frame of a prediction error signal based on the estimated frame and the frame of the input signal;

encode information indicative of the determined general prediction filter; and encode the frame of the prediction error signal.

19. A method, performed by an audio signal processing device, for decoding a frame of an encoded signal using a general prediction filter being representable as a ratio of a first and second FIR filter comprising first and second sets of coefficients, respectively; the method comprising extracting the coefficients of the general prediction filter from the encoded signal; wherein the coefficients of the general prediction filter were determined by:

determining an adjustable pole parameter and a plurality of FIR coefficients for an intermediate filter, such that an entropy of a frame of a prediction error signal which is derived from the frame of the input signal using the intermediate filter defined by the pole parameter and the plurality of FIR coefficients is reduced, wherein the intermediate filter comprises an FIR filter whose z variable is replaced by the z-transform of an allpass filter, the allpass filter exhibiting a pole defined by the adjustable pole parameter, wherein determining the pole parameter and the plurality of FIR coefficients comprises:

estimating the entropy of the frame of the prediction error signal obtained using the intermediate prediction filter defined by a set pole parameter and the plurality of FIR coefficients determined using the set pole parameter;

repeating determining the plurality of FIR coefficients and estimating the entropy for a plurality of differently set pole parameters; and selecting the pole parameter from the plurality of differently set pole parameters which reduces the estimated entropy of the frame of the prediction error signal; and mapping the determined pole parameter and the determined plurality of FIR coefficients for the intermediate filter to the first and second sets of coefficients for the general prediction filter, whereby the general prediction filter is configured to exhibit an infinite impulse response when the adjustable pole parameter is not zero and a finite impulse response when the adjustable pole parameter is zero;

decoding the frame of the prediction error signal;

determining a frame of an estimated decoded signal based on the decoded frame of the prediction error signal and the general prediction filter; and determining a decoded frame of the encoded signal based on the frame of the estimated decoded signal and the decoded frame of the prediction error signal;

wherein one or more of extracting the coefficients, decoding a frame, determining a frame of an estimated decoded signal, and determining a decoded frame of the encoded signal, are implemented, at least in part, by one or more hardware elements within the audio signal processing device.

20. An audio decoding device for decoding an encoded signal; wherein the audio decoding device is configured to:

extract coefficients of a general prediction filter being representable as a ratio of a first and second FIR filter comprising first and second sets of coefficients, respectively, from the encoded signal; wherein the coefficients of the general prediction filter were determined by:

determining an adjustable pole parameter and a plurality of FIR coefficients for an intermediate filter, such that an entropy of a frame of a prediction error signal which is derived from the frame of the input signal using the intermediate filter defined by the pole parameter and the plurality of FIR coefficients is reduced, wherein the intermediate filter comprises an FIR filter whose z variable is replaced by the z-transform of an allpass filter, the allpass filter exhibiting a pole defined by the adjustable pole parameter, wherein determining the pole parameter and the plurality of FIR coefficients comprises:

estimating the entropy of the frame of the prediction error signal obtained using the intermediate prediction filter defined by a set pole parameter and the plurality of FIR coefficients determined using the set pole parameter;

repeating determining the plurality of FIR coefficients and estimating the entropy for a plurality of differently set pole parameters; and selecting the pole parameter from the plurality of differently set pole parameters which reduces the estimated entropy of the frame of the prediction error signal; and mapping the determined pole parameter and the determined plurality of FIR coefficients for the intermediate filter to the first and second sets of coefficients for the general prediction filter, whereby the general prediction filter is configured to exhibit an infinite impulse response when the adjustable pole parameter is not zero and a finite impulse response when the adjustable pole parameter is zero;

decode the frame of the prediction error signal;

determine a frame of an estimated decoded signal based on the decoded frame of the prediction error signal and the general prediction filter; and determine a decoded frame of the encoded signal based on the frame of the estimated decoded signal and the decoded frame of the prediction error signal;

wherein one or more of extracting coefficients, decoding a frame, determining a frame of an estimated decoded signal, and determining a decoded frame of the encoded signal, are implemented, at least in part, by one or more hardware elements of the audio decoding device.

* * * * *